United States Patent [19]

Austermann

[11] Patent Number: 5,180,960
[45] Date of Patent: Jan. 19, 1993

[54] CIRCUIT ARRANGEMENT FOR COMMUTATING A RELUCTANCE MOTOR

[75] Inventor: Ralf Austermann, Herzogenrath-Kohlscheid, Fed. Rep. of Germany

[73] Assignee: U.S. Philips Corporation, New York, N.Y.

[21] Appl. No.: 732,367

[22] Filed: Jul. 18, 1991

[30] Foreign Application Priority Data

Aug. 10, 1990 [DE] Fed. Rep. of Germany ....... 4025350

[51] Int. Cl.⁵ .............................................. H02P 8/00
[52] U.S. Cl. .................................................. 318/701
[58] Field of Search ............... 318/701, 138, 254, 439, 318/696

[56] References Cited

U.S. PATENT DOCUMENTS

| | | | |
|---|---|---|---|
| 3,906,267 | 9/1975 | Coupin et al. | 318/254 |
| 4,162,435 | 7/1979 | Wright | 318/439 |
| 4,450,396 | 5/1984 | Thornton | 318/696 |
| 4,731,570 | 3/1988 | Lee | 318/701 |
| 4,868,478 | 9/1989 | Hedlund et al. | 318/701 |
| 5,093,643 | 8/1991 | Hedlund et al. | 318/701 |

FOREIGN PATENT DOCUMENTS 2556809 6/1976 Fed. Rep. of Germany .

Primary Examiner—William M. Shoop, Jr.
Assistant Examiner—John W. Cabeca

[57] ABSTRACT

A circuit arrangement is described for commutating a reluctance motor having a rotor (2) movable relative to a stator (1) and having a winding to which in specific positions of the rotor (2) relative to the stator (1) a current is applied by means of a switching device, and including a detection arrangement by which a voltage induced in the winding is detected and which enables the switching device when the induced voltage reaches a predetermined value. In a circuit arrangement of this type a simple, modular and thus universally usable structure is achieved in that the winding comprises at least three winding sections (110, 210, 310) arranged substantially equidistant along the motion coordinate (w) of the rotor (2) and winding sections that can individually admit current, so that from each winding section (110) the voltage (U1) induced therein is tapped and the enable signal (at 119) is derived when the predetermined value is reached, as a result of which signal the power supply to the preceding winding section (210) viewed in the direction of the motion coordinate (w) of the rotor (2) is terminated and initiated at a next winding section (310).

26 Claims, 2 Drawing Sheets

CIRCUIT ARRANGEMENT FOR COMMUTATING A RELUCTANCE MOTOR

BACKGROUND OF THE INVENTION

The invention relates to a circuit arrangement for commutating a reluctance motor comprising a rotor movable relative to a stator and a winding, to which a current is admitted through a switching device in specific positions of the rotor relative to the stator, and including a detection arrangement detecting a voltage induced in the winding and activating the switching device when the induced voltage reaches a predetermined value.

DE-OS 25 56 809 discloses a control circuit for a reluctance motor having variable magnetic conductivity. Herein the reluctance variation is used and, consequently, the variation of the magnetic conductivity of a magnetic circuit running through a motor winding when the rotor rotates relative to the stator. In the circuit the rotation of the rotor furthermore provides also a change of the self-inductance of the motor winding, the self-inductance having a direct ratio to the magnetic conductivity of the magnetic circuit. For energy supply the winding can be connected to a DC voltage source by means of a semiconductor switching circuit. Connected to the motor winding is a switching means through which the electromotive force induced in the motor winding during the rotary motion of the rotor and the blocking state of the semiconductor switching circuit can be detected and the semiconductor switching circuit can be switched through when the detected electromotive force reaches a predetermined value.

U.S. Pat. No. 4,450,396 discloses an electronically controlled synchronous machine having armature and field windings on the same magnetically-permeable core. The self-inductance of the armature and field windings is in essence independent of the relative position of the rotor and the stator in the machine, but mutual inductance between the armature and field windings varies with the relative position. A rotor position detector senses the voltage in one of the machine windings and relates this voltage to said relative position of the rotor and stator. Furthermore, switches are provided to control the electric current flow in the armature winding on the basis of the voltage sensed by the detector. In that Patent a solution is described according to which sensing signals for the relative position of rotor and stator are tapped from the armature windings. For controlling the switches a control means is provided which comprises a microprocessor.

SUMMARY OF THE INVENTION

It is an object of the invention to provide a simple circuit arrangement for commutating a reluctance motor, which arrangement can universally be used for reluctance motors having windings divided into various winding sections.

With a circuit arrangement of the type mentioned in the preamble this object is achieved according to the invention, in that the winding comprises no less than three winding sections arranged at least substantially equidistant along the motion coordinate of the rotor and individually capable of admitting current, in that from each winding section the voltage induced therein can be tapped and an enable signal can be derived from this voltage when the predetermined value is reached, which signal terminates the power supply to a preceding winding section viewed in the direction of the motion coordinate of the rotor and initiates the power supply to a next winding section.

In the circuit according to the invention the individual windings are energized with currents in a cyclic sequence. The power supply to the individual winding sections is controlled by means of an enable signal which is derived from a voltage on a winding section which section has a predetermined position relative to the motor winding section or motor winding sections respectively, to which current is to be applied. The induced voltage is thus not constantly tapped from the same winding section, but also tapped from various winding sections in a cyclic manner.

For example, when the voltage is tapped, a winding section may advantageously be taken into consideration which may happen not to have admitted a current for driving the motor. In this manner the sensing of the position is simplified owing to the separation of the power supply. Advantageously, use is made of the fact that the voltage tapped from a winding section is induced by the current flowing in the preceding winding section as a result of mutual inductance between this winding section and the preceding winding section viewed in the direction of the motion coordinate of the rotor. In dependence on the number of winding sections of the reluctance motor the allocation of the winding section from which the voltage is tapped and the winding sections that can be activated or deactivated can be effected such that always a cyclic rotation over all the winding sections is obtained.

Advantageously, the tapped voltage is in essence determined by the variation of the mutual inductance when the rotor is in motion. Basically, the induced voltage not only depends on the mutual inductance but also on the time delay of the current inducing this voltage in the preceding winding section. In order to suppress this dependence the current in the winding is maintained at a constant level while it occurs, so that voltage portions induced by a possible current variation are at least largely avoided. Thus, the induced voltage becomes an exact measure for the change of mutual inductance and hence for the change of the position between rotor and stator.

The circuit arrangement according to the invention preferably comprises for each winding section a signal processing branch for obtaining the enable signal from the induced voltage tapped from this winding section. Thus, a modular structure of the circuit arrangement according to the invention is achieved, in that for any number of winding sections the associated signal processing branch is provided and in that winding sections can be combined to each other in an order and association according to the invention. Control concepts for reluctance motors of various structures can thus be provided very fast and in a simple manner.

Further advantageous embodiments of the invention are disclosed in the subclaims.

BRIEF DESCRIPTION OF THE PREFERRED EMBODIMENTS

An exemplary embodiment of the invention is represented in the drawing Figures and will be further explained hereinafter, in which.

DETAILED DESCRIPTION OF THE PREFERRED EMBODIMENTS

Figure 1:
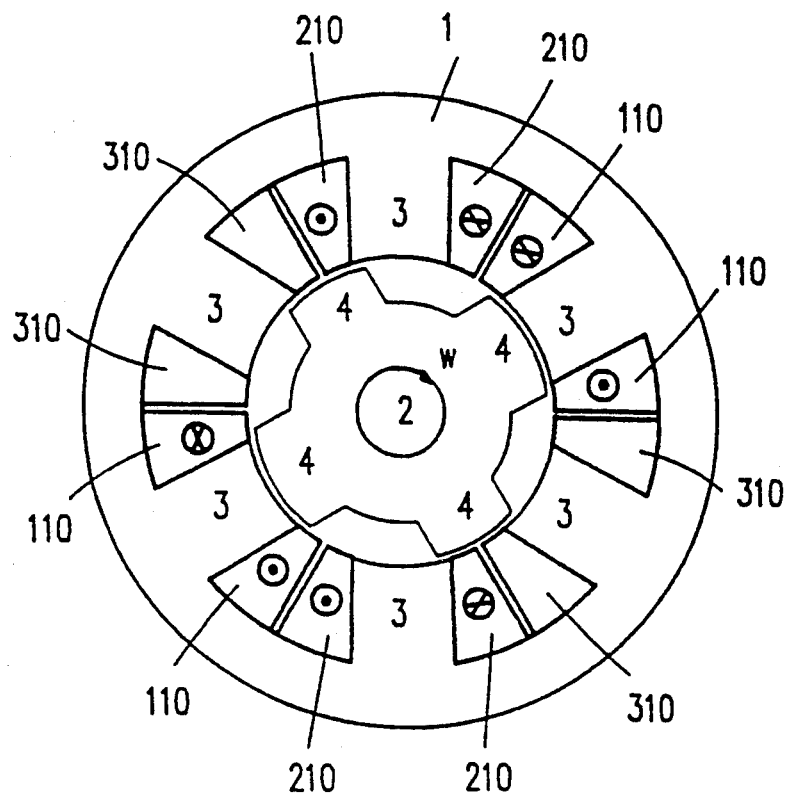
FIG. 1 represents the cross-section of a reluctance motor comprising a winding subdivided into three winding sections.

The reluctance motor as shown in FIG. 1 comprises a stator 1 of a circular cross-section, in whose centre a rotor 2 is journalled for rotation. The motion coordinate of the rotor 2 is referenced w. In the stator 1 a plurality of longitudinal slots are provided separated from each other by means of ridges of the stator material which ridges form pole shoes 3. In dependence on the number of winding sections of the reluctance motor six pole shoes 3 are uniformly distributed over the circumference of the stator 1. Accordingly, the rotor 2 presents in its cross-section a toothed circumference in which four poles 4 are provided by means of associated longtiudinal slots. Therefore, when two oppositely arranged poles 4 are in alignment with two oppositely arranged pole shoes 3, the other two poles 4 of the rotor 2 oppositely arranged and shifted through 90° assume intermediate positions between two of the remaining pole shoes 3 of the stator 1.

The winding sections 110, 210, 310 are arranged around each pair of facing pole shoes 3 of the stator 1. In FIG. 1 each winding section is thus shown to have four cross-sectional areas bearing identical reference characters. They are arranged over the pole shoes 3 of the stator 1 coounter-clockwise with respect to the order of the winding sections 110, 210, 310.

In addition to the exemplary embodiment shown in FIG. 1 the circuit arrangement according to the invention can also be used to commutate reluctance motors of different configurations. More specifically, a reluctance motor of this type may comprise a different number of winding sections and thus pole shoes as the one shown in FIG. 1; also an arrangement as a linear motor is possible.

Figure 3:
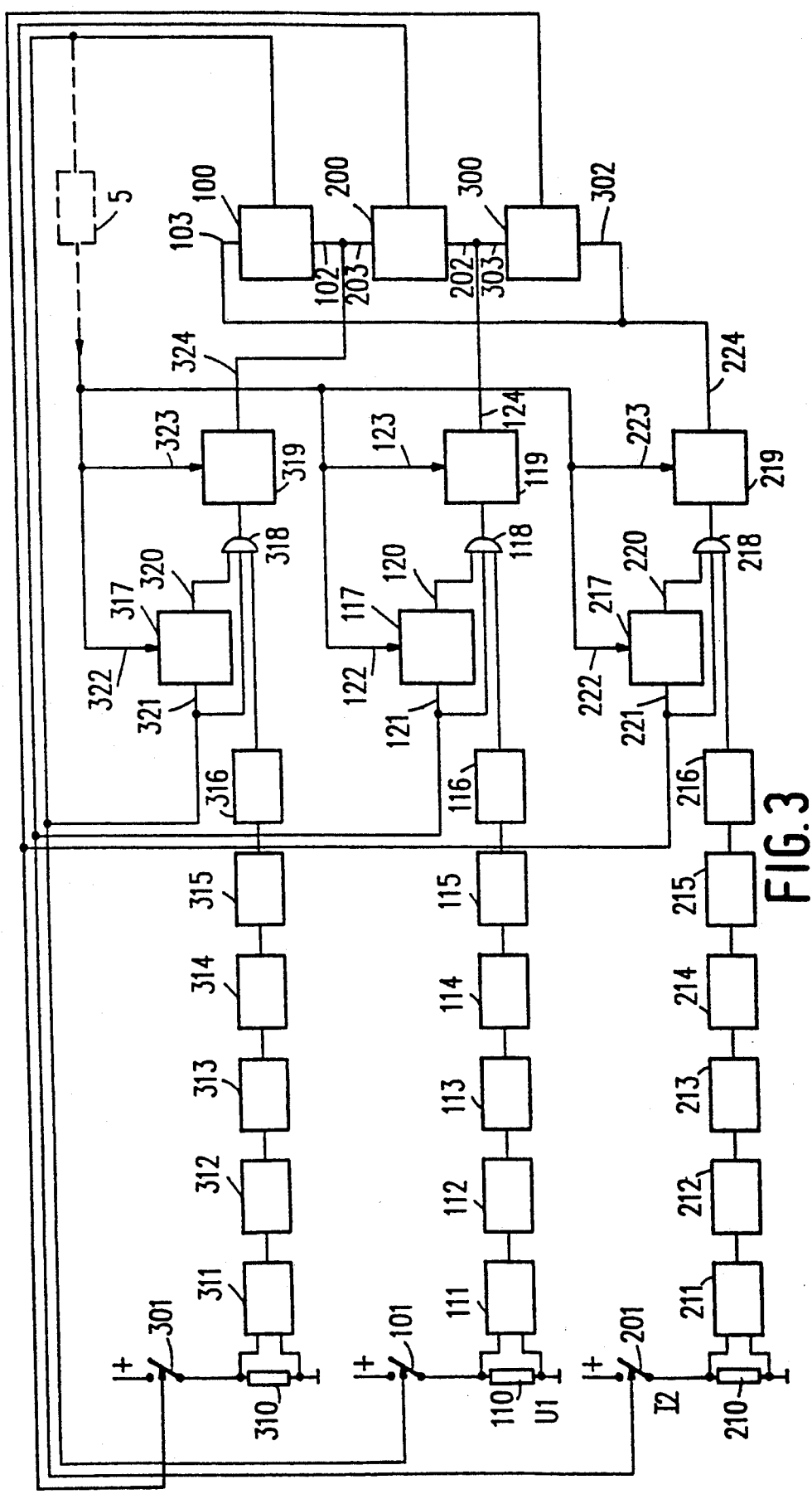
FIG. 3 shows the block diagram of a circuit arrangement according to the invention for commutating the reluctance motor as shown in FIG. 1.

FIG. 3 shows an example according to the invention of a circuit arrangement for commutation of reluctance motors as shown in FIG. 1, comprising three winding sections 110, 210, 310, which are represented in a simplified manner in the left part of the diagram shown in FIG. 3. Each of the winding sections 110, 210, 310 is connected in series to a switch 101, 201 and 301 respectively, between a supply voltage terminal marked by a plus sign and ground. Preferably, a DC voltage is supplied for the power supply of the reluctance motor through the supply voltage terminal. This DC voltage may have a constant value; preferably, however, it is supplied in the form of a high-frequency pulse width modulated pulsating DC voltage, so that a simple power control of the reluctance motor can be realised.

For each of the winding sections 110, 210 and 310 respectively, the circuit arrangement shown in FIG. 3 includes a signal processing branch 111 to 119, 211 to 219, 311 to 319 respectively, in which the enable signal is derived from the voltage tapped from the winding section 110, 210, 310 respectively concerned and made available. Furthermore, the circuit arrangment as shown in FIG. 3 comprises a status memory 100, 200, 300 for each winding section 110, 210, 310 respectively, in which memory a control signal for controlling the switch 101, 201, 301 associated to each winding section 110, 210, 310 respectively, to cause the current to flow in the winding section 110, 210, 310 respectively, is produced as a result of the enable signal from each preceding winding section 210, 310, 110 respectively, and is terminated by the enable signal from the next winding section 310, 210, 110 respectively. The switches 101, 201, 301 can be conceptually combined to a switching device to commutate the reluctance motor.

The structure and way of operation of the signal processing branches 111 to 119, 211 to 219, 311 to 319 connected to the status memories 100, 200, 300, to the switches 101, 201, 301 and to the winding sections 110, 210, 310 will be explained hereinafter with reference to, for example, the first winding section 110.

The signal processing branch 111 to 119 connected to the first winding section 110 comprises an impedance transformer 111 for tapping the voltage induced in the associated winding section 110, an analog switch 112 for clipping negative voltage peaks from the signal produced by the impedance transformer 111, an edge forming stage 113 to 118 for forming a defined edge from the output signal of the analog switch 112 and also a delay stage 119, in which the edge is delayed by a predeterminable period of time for the formation of the enable signal. The impedance transformer 111 has two inputs connected each to the winding section 110 and at each of which the voltage induced in the winding section 110 is available. In the impedance transformer 111 the subsequent stages of the signal processing branch are protected against the high voltages occurring at the winding section 110 when the transformer is in operation. Specifically the negative voltage peaks which occur in the winding section 110 when the current is switched off are clipped by the analog switch 112 following in the branch.

This signal is further processed in the edge-forming stage 113 to 118 which thereto comprises an amplifier 113 for amplifying the signal supplied by the analog switch 112, a low-pass filter 114 for suppressing high-frequency oscillations, a comparator 115 for making the edges steeper and a peak limiter 117, 118 for clipping undesired signal edges from the signal produced by the comparator 115 within a predeterminable period of time. In the low-pass filter 114 the signal amplified by the amplifier 113 is at least largely freed from the high-frequency oscillations which may occur as disturbances but may also be caused by a power control arrangement inserted before the described circuit arrangement. If, for example, the supply voltage terminals marked by a plus sign are connected to a preferably pulse-width modulated supply source, the power of the reluctance motor can be controlled by means of pulse-width modulation.

In the comparator 115 preferably an amplification and a limitation of the signal processed sofar is effected so that this signal leaves the comparator 115 in the form of pulse sequences with pulses having steep edges. The pulse edges produced in this manner occur at instants at which the signal applied to the comparator 115 and derived from the voltage induced in the winding section 110 exceeds or falls short of a reference level produced in the comparator 115. The pulse edges thus mark the instants at which the voltage induced in the winding section 110 reaches a predetermined value in accordance with the transmission ratio of the impedance transformer 111, the analog switch 112, the amplifier 113 and the low-pass filter 114.

In order to be in a position to select from a plurality of signal edges at the output of the comparator 115 a specific edge which bears a fixed time-dependent relation to the course of the motion coordinate w of the rotor 2, a peak limiter 117, 118 by which only the desired signal edge is passed and the remaining signal edges are suppressed is inserted after the comparator 115. The peak limiter 117, 118 comprises a delay stage 117 which produces at its output 120 a signal that has been applied to its input 121 and which is delayed for a dead time that can be adjusted by means of a control input 122. The input 121 of the delay stage 117 admits a control signal from the preceding winding section 210 which signal also controls the switch 201 associated to this winding section. This control signal reaches an input of an AND gate 118 in a delayed manner via the delay stage 117 and, another input 121 an input of the AND gate 118 directly via input 121, the third input of AND gate 118 being further reached by the signal having a steeper edge and coming from the comparator. The control signal and the delay stage 117 provide a time window whose initial position can be adjusted by means of the control input 122, within which time window the edges can be switched from the comparator 115 to the delay stage 119. Outside this time window the delay stage 119 does not receive any signal edges.

In respect of its function the delay stage 119 corresponds at least essentially to the delay stage 117. Also the delay of stage 119 can be adjusted by means of a control input 123.

At the output 124 of the delay stage 119 the enable signal is then generated, which is applied to both a reset input 202 of the status memory 200 of the preceding winding section 210 and to a set input 303 of the status memory 300 of the next winding section 310. Consequently, from the enable signal produced at the output 124 of the delay stage 119 in the first signal processing branch 111 to 119, the control signal for the switch 301 is produced in the status memory 300 of the next winding section 310 and, simultaneously, in the status memory 200 of the winding section 210 the control signal for the switch 201 is terminated. Worded differently, the control signal for the switch of each winding section is generated by the enable signal of the preceding winding section and terminated by the enable signal of the next winding section.

The signal processing branch 111 to 119 further comprises in FIG. 3 a potential separation stage 116 which is inserted in the edge forming stage 113 to 118 between the comparator 115 and the peak limiter 117, 118. The potential separation stage 116 preferably comprises an opto-electric coupler. This stage realizes a potential isolation between on the one hand the stages 111 to 115 connected to the winding section 110 and the stages 117 to 119 connected to the switch 101 as well as to the status memories 100 to 300 on the other.

The delay and dead times of the delay stage 117 and also of the delay stage 119 can be adjusted by means of the control inputs 122 and 123 of these stages respectively, as a function of the number of revolutions of the reluctance motor. For this purpose, the control inputs 122, 123 are connected to a speed measuring stage 5. In the simplest case this stage may derive a control voltage for one of the switches 101, 201, 301 from the frequency of the control signals by means of which voltage aforementioned delay intervals can be adjusted. In a further embodiment of the speed measuring stage 5 this stage can also produce a digital control signal. Furthermore, the control signals can also be taken into consideration for several of the switches 101, 201, 301 as regards the control of aforementioned delay intervals.

In FIG. 3 the signal processing branches having identical structures for all three winding sections are combined to a single overall circuit comprising the connection lines of the represented first winding section 110. In this circuit the status memories 100, 200, 300 as regards their reset inputs 102, 202, 302 respectively, and their set inputs 103, 203, 303 respectively, form a ring-shaped arrangement to which the switches 101, 201, 301 and the inputs 121, 221, 321 of the delay stages 117, 217, 317 respectively, are connected in the described manner.

In the circuit arrangement as shown in FIG. 3, the elements of the signal processing branches 211 to 219 and 311 to 319 for the second and third winding sections 210 and 310 respectively, not explicitly described but identically structured, are referenced by means of reference numbers corresponding to the first winding section 110, in which reference numbers the last two digits correspond to the last two positions of the elements concerned of the signal processing branch for the first winding section 110, and in which reference number the first digit indicates the number of the winding section.

Figure 2:
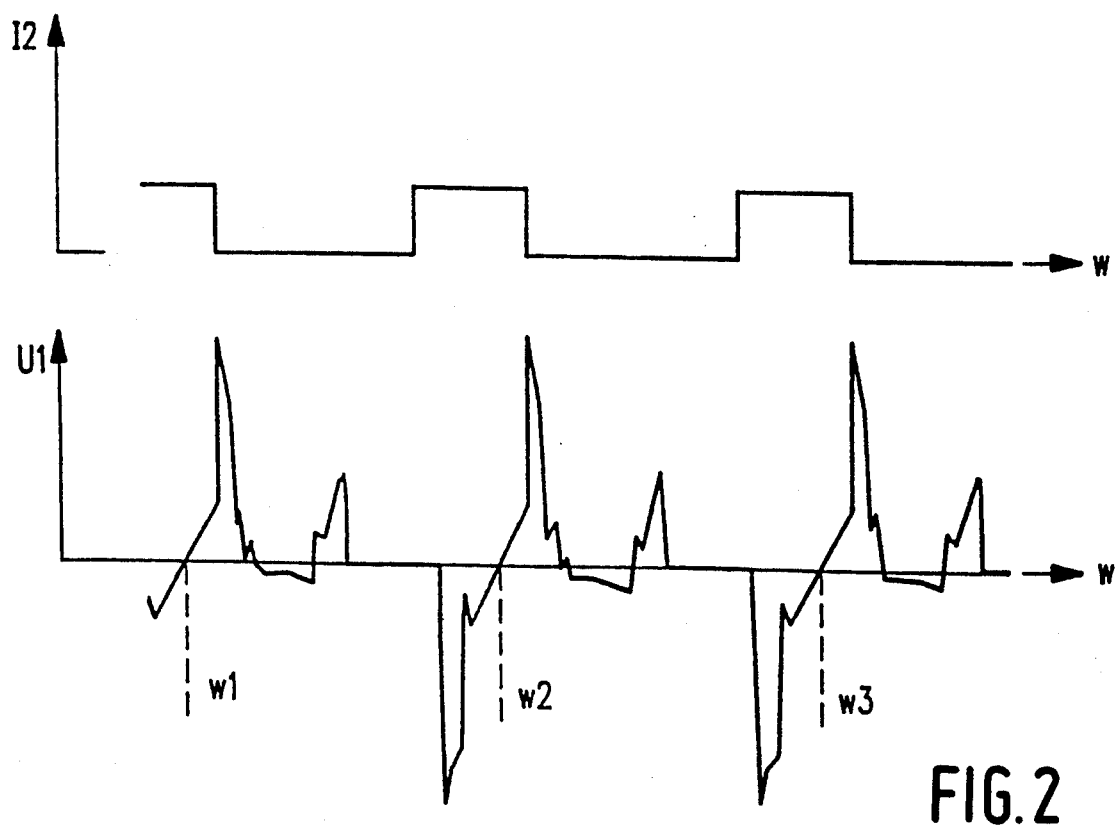
FIG. 2 shows signal variations in a reluctance motor as shown in FIG. 1.

In order to explain the operation of the circuit arrangement shown in FIG. 3 for commutation of the reluctance motor shown in FIG. 1, FIG. 2 shows, for example, the variation of the current I2 in the second winding section 210 as well as the voltage U1 induced by this current I2 in the first winding section 110 when switch 101 blocks. The Figure represents the variation of I2 and U2 along the motion coordinate w of the rotor 2. During energization of second winding section 210, current I2 flowing through second winding section 210 is maintained at a substantially constant value. Therefore the current I2 is a square wave current so that only when the current is switched on or off are voltage pulses induced in the phase winding 110. These voltage pulses can be recognized as positive or negative voltage peaks in the variation of U1 associated to the edges of the current I2. The further changes of the voltage U1 in the winding section 110 result from the change of the mutual inductance of the winding section 210 in which the current I2 flows and the winding section 110 in which the voltage U1 is induced. In the sections of the motion coordinate w in which sections the current I2 is switched on, regular voltage increases of the voltage U1 can be perceived which may be led back to a change of the mutual inductance with the motion coordinate w. At the motion coordinate points w1, w2, w3 the variation of the voltage U1 has zero-crossings whose positions are in essence determined by the geometry of the reluctance motor and thus have a precise allocation to the position of the rotor along its motion coordinate w. Conversely, the position of the rotor 2 can be derived with great precision from the occurrence of these zero-crossings. These zero-crossings are detected in the signal processing branches and the described signal edges are produced therefrom to form the enable signals.

I claim:

1. A circuit arrangement for driving a reluctance motor comprising:
   a rotor movable relative to a stator having at least a first winding section, a second winding section and a third winding section sequentially arranged along a path in the direction of rotor motion, each winding section positioned along the path substantially equidistant from two other winding sections;

commutation means for sequentially supplying based on switching means a substantially constant current to each of the winding sections; and detecting means for detecting a voltage in the first winding section induced by current flowing in the second winding section based on mutual inductance between the first winding section and the second winding section;

wherein said switching means is operable for terminating the substantially constant current supply from the commutation means to the second winding section and for initiating the substantially constant current supply from the commutation means to the third winding section based on the detected induced voltage in the first winding section.

2. The circuit arrangement of claim 1, wherein said detecting means is further operable for detecting a voltage in the third winding section induced by current flowing in the first winding section based on mutual inductance between the third winding section and the first winding section and for detecting a voltage in the second winding section induced by current flowing in the third winding section based on mutual inductance between the second winding section and the third winding section and wherein said switching means is further operable for terminating the substantially constant current supply from the commutation means to the first winding section and for initiating the substantially constant current supply from the commutation means to the second winding section based on the detected induced voltage in the third winding section and for terminating the substantially constant current supply from the commutation means to the third winding section and for initiating the substantially constant current supply from the commutation means to the first winding section based on the detected induced voltage in the second winding section.

3. The circuit arrangement in claim 2, further comprising signal processing means associated with each winding section, each signal processing means for producing an enable signal based on the induced voltage detected from the associated winding section.

4. The circuit arrangement as claimed in claim 3, wherein each signal processing means includes impedance transformer means for receiving the induced voltage of the associated winding section and for producing a transformer output signal; switch means for clipping negative voltage peaks from the transformer output signal and for producing a switch means output signal; edge forming means for forming a defined switching edge from the switch means output signal; and delay means for delaying the switching edge by a predeterminable time interval in forming the associated winding section enable signal.

5. The circuit arrangement as claimed in claim 4, wherein the edge forming means includes amplifier means for amplifying the switch means output signal and for producing an amplified signal; low-pass filter means for suppressing high-frequency oscillations of the amplified signal and for producing a filtered amplified signal; comparator means for enhancing edge steepness of the filtered amplified signal and for producing a comparator output signal; and peak limiter means for clipping undesired signal edges from the comparator output signal within a predeterminable period of time.

6. The circuit arrangement as claimed in claim 4, wherein the edge forming means includes a potential separation stage.

7. The circuit arrangement as claimed in claim 5, wherein the edge forming means further includes a potential separation stage.

8. The circuit arrangement as claimed in claim 7, wherein the potential separation stage is coupled between the comparator means and the peak limiter means.

9. The circuit arrangement as claimed in claim 8, wherein the potential separation stage comprises an opto-electric coupler.

10. The circuit arrangement of claim 3, further comprising status memory means associated with each winding section, each status memory means for storing a control signal based on at least one enable signal produced by non-corresponding signal processing means, said switching means responsive to the control signals for terminating and initiating current supply to the winding sections.

11. The circuit arrangement of claim 10, wherein said switching means responsive to the status memory means control signal associated with the first winding section terminates current supply to the first winding section based on the third winding section enable signal and initiates current supply to the first winding section based on the second winding section enable signal, wherein said switching means responsive to the status memory means control signal associated with the second winding section terminates current supply to the second winding section based on the first winding section enable signal and initiates current supply to the second winding section based on the third winding section enable signal and wherein said switching means responsive to the status memory means control signal associated with the third winding section terminates current supply to the third winding section based on the second winding section enable signal and initiates current supply to the third winding section based on the first winding section enable signal.

12. The circuit arrangement as claimed in claim 10, wherein each signal processing means includes impedance transformer means for receiving the induced voltage of the associated winding section and for producing a transformer output signal; switch means for clipping negative voltage peaks from the transformer output signal and for producing a switch means output signal; edge forming means for forming a defined switching edge from the switch means output signal; and delay means for delaying the switching edge by a predeterminable time interval in forming the associated winding section enable signal.

13. The circuit arrangement as claimed in claim 11, wherein each signal processing means includes impedance transformer means for receiving the induced voltage of the associated winding section and for producing a transformer output signal; switch means for clipping negative voltage peaks from the transformer output signal and for producing a switch means output signal; edge forming means for forming a defined switching edge from the switch means output signal; and delay means for delaying the switching edge by a predeterminable time interval in forming the associated winding section enable signal.

14. The circuit arrangement as claimed in claim 12, wherein the edge forming means includes amplifier means for amplifying the switch means output signal and for producing an amplified signal; low pass filter means for suppressing high frequency oscillations of the amplified signal and for producing a filtered amplified signal; comparator means for enhancing edge steepness of the filtered amplified signal and for producing a comparator output signal; and peak limiter means for clipping undesired signal edges from the comparator output signal within a predeterminable period of time.

15. The circuit arrangement as claimed in claim 13, wherein the edge forming means includes amplifier means for amplifying the switch means output signal and for producing an amplified signal; low pass filter means for suppressing high frequency oscillations of the amplified signal and for producing a filtered amplified signal; comparator means for enhancing edge steepness of the filtered amplified signal and for producing a comparator output signal; and peak limiter means for clipping undesired signal edges from the comparator output signal within a predeterminable period of time.

16. The circuit arrangement as claimed in claim 12, wherein the edge forming means includes a potential separation stage.

17. The circuit arrangement as claimed in claim 13, wherein the edge forming means includes a potential separation stage.

18. The circuit arrangement as claimed in claim 14, wherein the edge forming means further includes a potential separation stage.

19. The circuit arrangement as claimed in claim 15, wherein the edge forming means further includes a potential separation stage.

20. The circuit arrangement as claimed in claim 18, wherein the potential separation stage is coupled between the comparator means and the peak limiter means.

21. The circuit arrangement as claimed in claim 19, wherein the potential separation stage is coupled between the comparator means and the peak limiter means.

22. The circuit arrangement as claimed in claim 8, wherein the potential separation stage comprises an opto-electric coupler.

23. The circuit arrangement as claimed in claim 16, wherein the potential separation stage comprises an opto-electric coupler.

24. The circuit arrangement as claimed in claim 17, wherein the potential separation stage comprises an opto-electric coupler.

25. The circuit arrangement as claimed in claim 20, wherein the potential separation stage comprises an opto-electric coupler.

26. The circuit arrangement as claimed in claim 21, wherein the potential separation stage comprises an opto-electric coupler.

* * * * *